Patented Jan. 23, 1945

2,368,062

UNITED STATES PATENT OFFICE 2,368,062

CELLULOSE TRIACETATE COATING COMPOSITIONS

Charles Bogin, Terre Haute, Ind., assignor to Commercial Solvents Corporation, Terre Haute, Ind., a corporation of Maryland No Drawing. Application April 22, 1942,
Serial No. 440,099

7 Claims. (Cl. 106—176)

The present invention relates to new and improved cellulose ester coating compositions. More particularly, it is concerned with a method of producing cellulose triacetate coating compositions capable of forming stable, clear, tough, and water-resistant films.

Cellulose acetate is produced commercially in a number of grades, which differ in their degree of acetylation. In the ordinary processes by which cellulose acetate is manufactured, it is first produced as a highly-esterified product possessing an acetic acid content of approximately 62 per cent. This material, however, is soluble only in a very limited number of solvents, such as tetrachloroethane, ethylene dichloride, etc., and because of the relatively high toxicity of the latter solvents, solutions of highly acetylated cellulose acetate are obviously impractical for most commercial applications. The commercial grades of cellulose acetate, i. e., those used at the present time in artificial silks, plastics, motion picture films, airplane dopes, and lacquers, are commonly known as "secondary" acetates. These secondary acetates are made by subjecting the substantially fully-esterified cellulose to treatment with acidulated water, which results in partial hydrolysis of the highly-esterified material, thus replacing a portion of the acetyl groups with hydroxyl groups. Because of the introduction of hydroxyl groups into the cellulose acetate, the solubility of the latter is considerably increased and it may readily be dissolved in a number of the oxygenated organic solvents, such as acetone, methyl acetate, ethyl lactate, diacetone alcohol, mixtures of nitroparaffins and alcohols, and the like.

The films formed from such cellulose acetate solutions possess certain disadvantages, however, which tend to prevent the use of considerable quantities thereof in many fields. For example, such films possess rather poor water-resistant properties, and if immersed in water, or even exposed to a humid atmosphere, moisture is rapidly absorbed thereby, resulting in a material reduction in the strength and tension of said films. This undesirable property hampers the use of this grade of cellulose acetate in the formulation of airplane dopes, and to some extent in the production of motion picture films and coated textiles. Because of these undesirable properties possessed by films formed from the various secondary grades of cellulose acetate, there has been an existing need for a film-forming material having essentially the same solubility characteristics as the secondary grades of cellulose acetate, but which exhibits greater water resistance than is exhibited by the lower acetylated cellulose acetate films. As possible substitutes, there have been proposed coating compositions in which the secondary acetates have been replaced by cellulose acetate butyrate, or cellulose acetate propionate. These materials in general, however, give films which are substantially softer than those formed from straight cellulose acetate, and are also more expensive. It is therefore evident that the highly esterified cellulose acetate, whose solutions are capable of producing clear, tough, and water-resistant films, would be readily accepted for use in numerous fields provided an economical and substantially non-toxic solvent or solvent mixture could be provided.

I am fully aware of the fact that cellulose triacetate coating compositions have previously been prepared by using as a solvent a mixture consisting of approximately 70 per cent nitromethane and 30 per cent of an aliphatic alcohol having less than five carbon atoms, or mixtures in which approximately half of the alcohol content is replaced by an aromatic hydrocarbon, such as benzene, or toluene. Such solvent mixtures will dissolve cellulose triacetate satisfactorily, and the resulting solutions thus produced are in most instances perfectly clear. I have found it impossible for all practical purposes, however, to produce clear films by the use of such nitromethane-alcohol mixtures since the range of nitromethane-alcohol proportions permissible from the standpoint of solubility is very narrow, and inasmuch as these two volatile liquids do not evaporate at the same rate, the necessary solvent balance is rapidly destroyed during the drying of the film, leading to a precipitation of the cellulose triacetate.

I have now discovered that the nitroparaffins, in general, or mixtures containing the same, when mixed with a relatively small proportion of a true solvent for cellulose triacetate, constitute excellent solvents for grades of cellulose triacetate having acetic acid contents ranging from about 58 to 62 per cent. Prior to the present invention, the use of nitroparaffins in cellulose triacetate solvent mixtures was limited to nitromethane. However, it has now been made possible to prepare cellulose triacetate solutions, possessing an exceedingly high tolerance for a wide variety of solvent mixtures, and which may contain the higher nitroparaffins, as well as nitromethane. It is therefore obvious that such compositions, particularly from the standpoint of commercial application, are much more desirable than the compositions produced by dissolving cellulose triacetate in nitromethane-alcohol mixtures, since the latter, as mentioned above, are subject to the disadvantage that the permissible proportions of nitromethane and alcohol, which may be utilized in cellulose triacetate solutions, are restricted to a very narrow range.

As a further result of the present invention, the quantity of true solvent required in the preparation of cellulose triacetate solution has been materially decreased. Such an improvement constitutes a distinct advance in the art of cellulose triacetate coating compositions in view of the fact that the known true solvents for cellulose triacetate are comparatively toxic substances. Consequently, this property has greatly hindered the wide industrial application of cellulose triacetate solutions in many fields for which they were otherwise admirably suited. Furthermore, solutions of cellulose triacetate dissolved in true solvents of the aforesaid type have a very low tolerance for all of the more common volatile organic liquids, such as esters, ketones, alcohols, etc., as shown in the table appearing below.

These data likewise show the comparatively high tolerances of solutions of cellulose triacetate in various true solvents therefor, for certain of the nitroparaffins, as well as for mixtures of the nitroparaffins with toluene and/or alcohols.

very rapidly when the concentration of 1-nitropropane falls below 30 per cent.

In the case of solutions of cellulose triacetate prepared by dissolving the latter in tetrachloroethane or in a mixture of 90 parts of ethylene chloride and 10 parts of anhydrous ethyl alcohol, it will be noted that the tolerances for 1-nitropropane and for mixtures of 1-nitropropane and ethyl alcohol are high, while the tolerances for ethyl alcohol, butyl alcohol, butyl acetate, and toluene are very low.

The tolerances of a solution of cellulose triacetate in a mixture consisting of 70 per cent nitromethane and 30 per cent anhydrous ethyl alcohol, are observed to be very high for 1-nitropropane or its mixtures with alcohols. The nitromethane-alcohol mixtures can thus be modified greatly by other liquids, and can also impart solvent power to the 1-nitropropane.

As previously stated, the high toxicity of the true or active solvents for cellulose triacetate make it desirable to employ such materials in minimum proportions and the factor which determines this minimum value is the degree of solubility of the cellulose triacetate in the particular solvent mixture contemplated. When employing cellulose triacetate in the preparation of coating compositions, I have found it desirable to dissolve it first in the form of a

*Table*

| Composition of cellulose triacetate solution | Diluent or diluent mixture | Tolerance |
|---|---|---|
| 25% solution of cellulose triacetate (60.9% acetic acid) in tetrachloroethane | 1-nitropropane | More than 10.0 |
| | 30% 1-nitropropane / 70% anhydrous ethyl alcohol | 3.9 |
| | 70% 1-nitropropane / 30% anhydrous ethyl alcohol | More than 10.0 |
| | 30% 1-nitropropane / 30% anhydrous ethyl alcohol / 40% toluene | More than 15.0 |
| | 20% 1-nitropropane / 40% anhydrous ethyl alcohol / 40% toluene | 1.75 |
| | 20% 1-nitropropane / 80% butanol | 2.0 |
| | 30% 1-nitropropane / 30% butanol / 40% toluene | More than 15.0 |
| | 30% 2-nitropropane / 70% anhydrous ethyl alcohol | 4.15 |
| | 40% 2-nitropropane / 60% butanol | 4.1 |
| 5% solution of cellulose triacetate (62% acetic acid) in tetrachloroethane | Ethyl acetate | 1.8 |
| | Butyl acetate | 0.7 |
| | Ethyl alcohol (95%) | 1.4 |
| | Ethyl alcohol (anhyd.) | 1.2 |
| | Butyl alcohol | 1.2 |
| | "Cellosolve" | 0.8 |
| | "Hexone" | 0.5 |
| | Toluene | 0.6 |
| | 50% butyl acetate / 50% ethyl alcohol | 1.2 |
| | 1-nitropropane | More than 7.0 |
| | 50% 1-nitropropane / 50% anhydrous ethyl alcohol | more than 8.0 |
| 15% solution of cellulose triacetate (60.9% acetic acid) in 90-10 ethylene chloride-anhydrous ethyl alcohol | Anhydrous ethyl alcohol | 0.5 |
| | Butanol | 1.0 |
| | Butyl acetate | 1.0 |
| | Toluene | 0.5 |
| | 1-nitropropane | More than 7.5 |
| | Toluol | 1.7 |
| 15% solution of cellulose triacetate (60% acetic acid) in 70-30 nitromethane-anhydrous ethyl alcohol | Anhydrous ethyl alcohol | 0.5 |
| | 50% 1-nitropropane / 50% butanol | More than 7.5 |
| | 50% 1-nitropropane / 50% anhydrous ethyl alcohol | 7.5 |

In the above table the tolerances of the solution produced from tetrachloroethane and cellulose triacetate for the three-component mixtures of 1-nitropropane, alcohols, and toluene, are substantially higher than the values for the simple mixtures of 1-nitropropane and alcohols free from toluene. The results obtained also indicate that the tolerance of tetrachloroethane for mixtures of 1-nitropropane and alcohols decreases stock solution containing from two to three times the concentration required for spray application. The resulting stock solution may then be diluted with the appropriate thinners to the proper consistency. This procedure is particularly advantageous inasmuch as the proportions of true solvents necessary for the preparation of the more concentrated stock solutions are only slightly higher than those required for the preparation of the more dilute solutions. Since the thinners employed need not contain any of the toxic true solvents, this practice allows the formulation of final solvent mixtures containing a minimum of said true solvents. In this connection the process of solution is aided considerably by elevated temperatures. For example, I have observed that if a well-dispersed mixture of cellulose triacetate and volatile solvents is subjected to a temperature of about 70° C. for a relatively short period, e. g., one-half hour, the process of solution is improved appreciably. As a result, stock solutions prepared under such conditions may contain from 10 to about 15 per cent less of the true solvent than is necessary to obtain cellulose triacetate solutions of equal concentration at ordinary temperatures. Adequate agitation during the process of solutions is also another factor to be taken into consideration in preparing such stock solutions of cellulose triacetate. For example, by the combined use of elevated temperatures and thorough agitation, stock solutions containing three times as much cellulose triacetate as is necessary for spraying purposes can be prepared by the use of solvent mixtures containing from 20 to 25 per cent tetrachloroethane, 50 per cent 1-nitropropane and 25 to 30 per cent ethyl alcohol. Such solvent mixtures can be readily diluted with thinners containing no tetrachloroethane whatever. The final cellulose triacetate solutions thus obtained will therefore contain the true solvent, in this case tetrachloroethane, in about one-third the amount present in the stock solution, i. e., 7 to 8 per cent. Thus, it may be seen that the cellulose triacetate solutions of the present invention are considerably less objectionable than those of the prior art from the standpoint of toxicity.

Frequently, concentrated solutions of cellulose triacetate containing nitroparaffins, tend to increase in viscosity and gel on aging. This particular type of instability has been found to be directly connected with the richness of the solvent mixtures. Such solutions of cellulose triacetate which contain only moderate proportions of aromatic hydrocarbon-alcohol mixtures, are, however, found to be fully stable to storage. In the actual preparation and handling of such solutions, it will therefore be advisable to employ moderate amounts of said aromatic hydrocarbon-alcohol mixtures in the concentrated stock bases which consist essentially of cellulose triacetate and a true solvent therefor. Additional quantities of the aromatic hydrocarbon-alcohol mixture may be conveniently introduced into the diluent mixture. Any of the customary aromatic hydrocarbons commonly employed in coating compositions, may be utilized for this purpose, such as, for example, benzene, toluene and xylene. I prefer, however, to employ toluene for most purposes.

Examples of the true or active solvents which may be utilized in the formulation of cellulose triacetate compositions possessing the aforesaid properties, are tetrachloroethane, trichloroethane, ethylene chlorohydrin, dioxane, and a mixture consisting of ethylene chloride and from about 5 to 25 per cent of a lower aliphatic alcohol. The proportion of the true cellulose triacetate solvents of the above type necessary to prevent precipitation during the drying of the freshly-applied films, will vary, depending upon whether a slow evaporating solvent, such as tetrachloroethane, is employed, or a relatively rapid evaporating solvent, such as ethylene chloride, is utilized as the true solvent. The proportion of such solvents will also be found to depend upon the character of the nitroparaffin mixture, greater proportions being necessary in the case of solvent mixtures containing relatively large percentages of comparatively slow evaporating solvents, such as butyl alcohol, butyl acetate, etc. The proportion of true solvents necessary will also depend somewhat on the nature of the cellulose triacetate used, i. e., the substantially completely-acetylated cellulose triacetate which contains approximately 62 per cent acetic acid, or the slightly hydrolyzed grade having an acetic acid content of from 59 to 60 per cent. However, in general a number of solvent mixtures containing as little as from 3 to 5 per cent of one or more of the above-mentioned true cellulose triacetate solvents, will be found to be satisfactory for the production of cellulose triacetate solutions capable of forming clear, tough, and water-resistant films.

The nitroparaffins, in addition to nitromethane, which may be employed, are nitroethane, 1-nitropropane, 2-nitropropane, the nitrobutanes, the nitropentanes, and the like. The quantity of nitroparaffins utilized will likewise be found to vary with the character of the true solvents employed, as well as the acetic acid content of the cellulose triacetate. In general, however, the nitroparaffin content of the solvent mixture may vary from approximately 30 per cent to 70 per cent.

The alcohols used in preparing the cellulose triacetate compositions of the present invention may be any of the lower saturated aliphatic monohydric alcohols, and particularly those containing 1 to 4 carbon atoms. The proportion of such alcohols utilized is, of course, subject to variation, depending upon the particular grade of cellulose triacetate, the alcohol employed, and the character and quantity of the other components of the solvent mixture. In general, satisfactory solutions may be prepared by employing solvent mixtures containing from 20 to 40 per cent alcohol.

The amount of aromatic hydrocarbon used is subject to substantially the same conditions as the aforesaid alcohols. Generally the quantity of such hydrocarbons present may constitute from 10 to 30 per cent of the solvent mixture.

My invention may be further illustrated by the following examples which describe typical compositions that may be produced in accordance with my discovery.

*Example I*

Cellulose triacetate having an acetic acid content of 61.0 per cent was added in a ratio of 15 grams per 100 c. c. of a solvent mixture consisting of 24 parts tetrachloroethane, 50 parts 1-nitropropane and 26 parts ethyl alcohol. To the resulting solution was added, with thorough agitation, a thinner consisting of 70 parts 1-nitropropane, 19 parts ethyl alcohol, 30 parts butyl alcohol and 81 parts toluene. This solution, when applied in accordance with any of the common methods of application, produced a clear, tough and water-resistant film.

*Example II*

To a solvent mixture consisting of 25 parts dioxane, 48 parts 1-nitropropane and 27 parts ethyl alcohol, cellulose triacetate having an acetic acid content of 59 per cent, was added in a ratio of 20 grams of cellulose triacetate per 100 c. c. of solvent. The resulting solution was slightly cloudy; however, with the aid of heat and agitation it became perfectly clear. A thinner consisting of 100 parts 1-nitropropane, 32.5 parts butyl alcohol, 62.5 parts toluene and 30 parts ethyl alcohol was then added thereto with agitation. The composition thus secured, when applied in accordance with ordinary lacquer application methods, formed a clear, tough, and water-resistant film of cellulose triacetate.

Having now described my invention, what I claim is:

1. A composition of matter comprising cellulose triacetate having an acetic acid content of from 58 to 62 per cent dissolved in a solvent mixture comprising a major proportion of a non-solvent mixture containing a lower nitroparaffin and a lower aliphatic alcohol, the predominant portion of said non-solvent mixture consisting of said lower nitroparaffin, and a minor proportion of a true solvent for said cellulose triacetate selected from the group consisting of tetrachloroethane, trichloroethane, ethylene chloride, ethylene chlorohydrin, and dioxane, such solvent mixture being substantially non-toxic and easily capable of maintaining the cellulose triacetate in a dissolved state throughout the drying process when said composition is applied to a smooth surface.

2. A composition of matter comprising cellulose triacetate having an acetic acid content of from about 58 per cent to about 62 per cent dissolved in a solvent mixture comprising a major proportion of a non-solvent mixture containing a lower nitroparaffin, a lower aliphatic alcohol, and an aromatic hydrocarbon, and a minor proportion of a true solvent for said cellulose triacetate selected from the group consisting of tetrachloroethane, trichloroethane, ethylene chloride, ethylene chlorohydrin and dioxane, such solvent mixture being substantially non-toxic and easily capable of maintaining the cellulose triacetate in a dissolved state throughout the drying process when said composition is applied to a smooth surface.

3. The composition of claim 2 in which the aromatic hydrocarbon is toluene.

4. A composition of matter comprising cellulose triacetate dissolved in a solvent mixture comprising a major proportion of a non-solvent mixture containing nitromethane and a lower aliphatic alcohol, the predominant portion of said non-solvent mixture consisting of said nitromethane, and a minor proportion of a true solvent for said cellulose triacetate selected from the group consisting of tetrachloroethane, trichloroethane, ethylene chloride, ethylene chlorohydrin, and dioxane, such solvent mixture being substantially non-toxic and easily capable of maintaining the cellulose triacetate in a dissolved state throughout the drying process when said composition is applied to a smooth surface.

5. A composition of matter comprising cellulose triacetate dissolved in a solvent mixture comprising a major proportion of a non-solvent mixture containing 1-nitropropane and a lower aliphatic alcohol, the predominant portion of said non-solvent mixture consisting of said 1-nitropropane, and a minor proportion of a true solvent for said cellulose triacetate selected from the group consisting of tetrachloroethane, trichloroethane, ethylene chloride, ethylene chlorohydrin, and dioxane, such solvent mixture being substantially non-toxic and easily capable of maintaining the cellulose triacetate in a dissolved state throughout the drying process when said composition is applied to a smooth surface.

6. A composition of matter comprising cellulose triacetate having an acetic acid content of from about 58 per cent to about 62 per cent dissolved in a solvent mixture comprising a major proportion of a non-solvent mixture containing nitromethane, a lower aliphatic alcohol, and an aromatic hydrocarbon, the predominant portion of said non-solvent mixture consisting of nitromethane, and a minor proportion of a true solvent for cellulose triacetate selected from the group consisting of tetrachloroethane, trichloroethane, ethylene chloride, ethylene chlorohydrin, and dioxane, such solvent mixture being substantially non-toxic and easily capable of maintaining the cellulose triacetate in a dissolved state throughout the drying process when said composition is applied to a smooth surface.

7. The composition of claim 6 in which 1-nitropropane is substituted for nitromethane.

CHARLES BOGIN.